April 13, 1965     H. WEBERS     3,178,039
APPARATUS FOR INVERTING WELDED CONCRETE
REINFORCING MESH AND THE LIKE
Filed Dec. 4, 1961

Inventor:
HEINZ WEBERS
BY Michael J. Striker
ATTORNEY

United States Patent Office 3,178,039
Patented Apr. 13, 1965

3,178,039
APPARATUS FOR INVERTING WELDED CONCRETE REINFORCING MESH AND THE LIKE
Heinz Webers, Dusseldorf, Germany, assignor to Bau-Stahlgewebe G.m.b.H., Dusseldorf-Oberkassel, Germany
Filed Dec. 4, 1961, Ser. No. 156,572
Claims priority, application Germany, Dec. 6, 1960, B 60,371
7 Claims. (Cl. 214—1)

The present invention relates to an apparatus for inverting comparatively large and heavy flat objects, and more particularly to an apparatus which is especially suited for inverting welded concrete reinforcing mesh, also called mats, prior to stacking of such mats for the purpose of storage or transportation.

An important object of the invention is to provide an inverting apparatus for plate-, lattice- or grid-like flat objects which is especially suited for use in the production and processing of concrete reinforcing mats produced in a cross-wire spot welding machine.

Another object of the invention is to provide an apparatus of the just outlined characteristics which constitutes a labor-saving improvement in the production and processing of concrete reinforcing mats, which reduces the likelihood of accidents due to tiredness of personnel in charge of the production of such mats, and which can be utilized with mats of different size, weight and/or construction.

A further object of the instant invention is to provide an inverting apparatus for concrete reinforcing mats or the like whose operation is fully automatic and which is capable of selectvely inverting alternate mats whereas the remaining mats may be advanced to the stacking station in the non-inverted position in which they are discharged from the welding machine.

An additional object of my invention is to provide an inverting or reversing apparatus which not only inverts but also properly locates the mats in such a way that the mats are in optimum position for transfer to the stacking station.

Still another object of the invention is to provide an apparatus of the above outlined characteristics which is of extremely simple construction, which comprises a minimal number of moving parts, and which is readily accessible to workmen in charge of transferring inverted or non-inverted mats to the stacking station.

A further object of the invention is to provide a method of manufacturing, selectively inverting and stacking concrete reinforcing mats and like flat objects.

With the above objects in view, the invention mainly resides in the provision of an inverting apparatus which comprises a base provided with a substantially horizontal object supporting surface, a chute which is adjacent to and extends upwardly from the base and which encloses with the supporting surface an angle of more than 90 degrees, a turning member having a pivot axis substantially parallel with the supporting surface and adjacent to the lower portion of the chute, this turning member preferably comprising at least two spaced arms which are turnable about the pivot axis between an idle position in which they are located below the object supported on the surface of the base and an inverting position in which they are adjacent to and transfer the object in inverted position onto the chute so that the inverted object may slide along the chute and back onto the supporting surface when the arms return to idle position, and means for turning the arms between their idle and inverting positions.

Certain other features of the invention reside in special construction of the arms so that they exert a braking action upon and prevent the inverted object from returning onto the supporting surface before the turning member returns all the way to its idle position, in the provision of a trough which constitutes a smooth transition between the chute and the supporting surface, in the provision of a special drive for the shaft which supports the arms of the turning member, in the provision of means which arrests the inverted object on the same portion of the supporting surface from which the object is lifted when the arms of the turning member are moved to their inverting position, and in the provision of a welding machine for the production of mat-like welded objects which includes means for automatically starting the arms of the turning member from their idle position whenever a selected mat is located on the supporting surface.

The novel features which are considered as characteristic of the invention are set forth in particular in the appended claims. The invention itself, however, both as to its construction and its method of operation, together with additional objects and advanages thereof, will be best understood from the following detailed description of a specific embodiment with reference to the accompanying drawings, in which:

Figure 1:
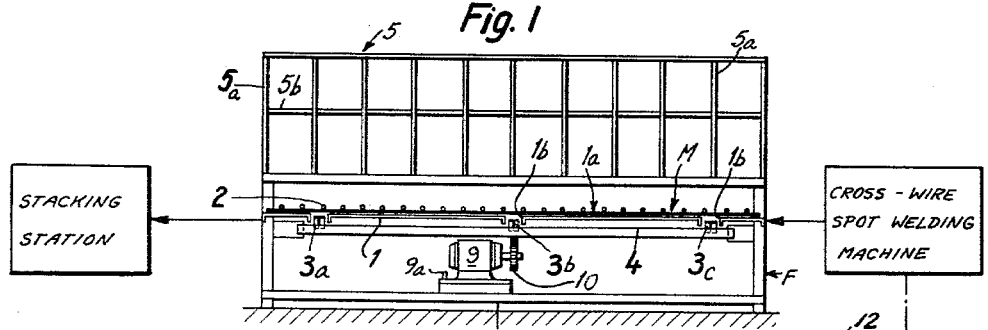
FIG. 1 is a partly schematic front elevational view of a system which includes an inverting apparatus embodying one form of my invention.
Figure 6:
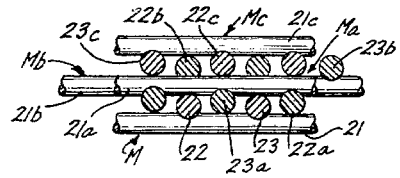
FIG. 6 is a fragmentary end elevational view of four stacked mats.

Referring now in greater detail to the illustrated embodiment, and first to FIG. 1, there is shown an inverting station A which is located intermediate a welding station B and a stacking station C. In the arrangement of FIG. 1, the station B is assumed to include a so-called cross-wire spot welding machine which produces concrete reinforcing mesh, fence wire, refrigerator parts and like welded structures M, Ma, Mb, Mc . . . hereinafter called mats. As illustrated in FIG. 6, each mat comprises a layer of spaced parallel longitudinal rods 21, 21a, 21b, 21c and a layer of spaced parallel transverse rods 22, 22a, 22b, 22c which together form a lattice-like structure and which are welded to each other at the points of intersection 23, 23a, 23b, 23c. The welding operation is carried out at the station B, and the mats are thereupon consecutively advanced to the inverting station A which comprises an apparatus adapted to invert each second mat so that, at the stacking station C, an inverted mat M with its longitudinal rods 21 down is located beneath a non-inverted mat Ma with its longitudinal rods 21a up in a manner as illustrated in FIG. 6, i.e. with the transverse rods 22a of the mat Ma extending into the spaces between the transverse rods 22 of the mat M, with the longitudinal rods 21b of the inverted mat Mb extending into the spaces between the longitudinal rods 21a of the mat Ma, with the transverse rods 22c of the non-inverted mat Mc extending between the transverse rods 22b of the mat Mb, and so on. In other words, the transverse rods of the mats M, Ma are disposed in a common plane, the longitudinal rods of the mats Ma, Mb are again disposed in a common plane, etc.

Figure 5:
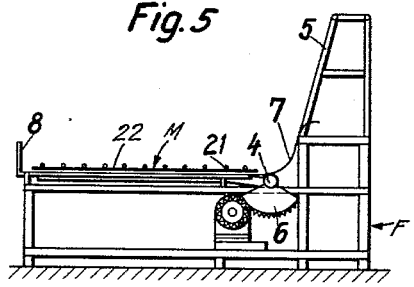
FIG. 5 shows the structure of FIGS. 2 to 4 with the turning member back in its idle position and with the mat turned thorugh full 180 degrees.

The inverting apparatus comprises a base or bedplate 1 which provides a horizontal supporting surface 1a for the mats advancing from the welding station B. As shown in FIG. 1, the base 1 is mounted on a frame F and is provided with several spaced parallel slots 1b for the arms 3a, 3b, 3c of a pivotable turning member 3. This turning member is mounted on and is rigid with a horizontal shaft 4 which is turnably mounted in the frame F and whose pivot axis is perpendicular to the longitudinal direction of the slots 1b, i.e., the axis of the shaft 4 is parallel with and is adjacent to the path of mats M, Ma, Mb, Mc . . . advancing from the welding station B through the inverting station A and to the stacking station C. In the idle position of the turning member 3, its arms 3a–3c are received in the slots 1b and are preferably located at a level slightly below the supporting surface 1a so that the mats meet little resistance while advancing from the welding station B onto the base 1. Such idle position of the turning member 3 is illustrated in FIGS. 1, 2 and 5.

The shaft 4 is disposed between the base 1 and the lower portion of an upwardly and rearwardly inclined slide or chute 5 which is mounted on or forms part of the frame F. As shown in FIG. 1, the chute 5 may assume the form of a network consisting of vertical bars 5a and one or more horizontal bars 5b, but it is equally possible to utilize a chute in the form of a plate or the like. The lower portion 7 of the chute 5 preferably assumes the form of a transversely extending concave channel member or trough which provides a smooth transition between the network of bars 5a, 5b and the rear edge portion of the base 1. In other words, the trough is located in immediate proximity of the shaft 4.

Figure 2:
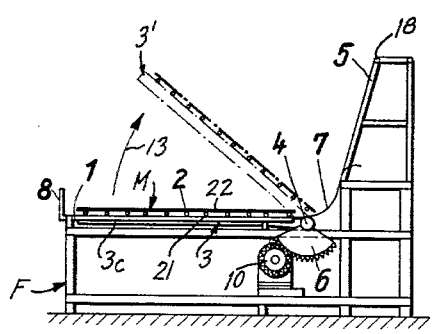
FIG. 2 is a side elevational view of the inverting apparatus, showing the turning member in idle position and a mat in a position it assumes just before the inverting step.
Figure 3:
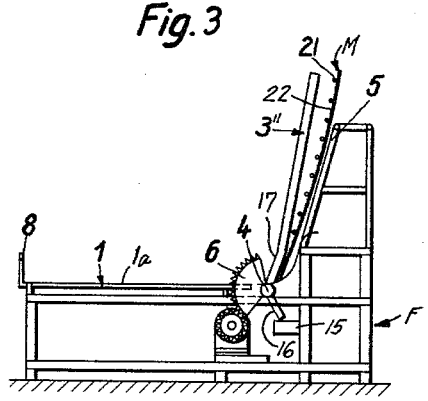
FIG. 3 illustrates the structure of FIG. 2 with the turning member in its inverting position.

The means for moving the turning member 3 between the idle position of FIG. 1 or 2 and the inverting position of FIG. 3 comprises a segmental gear 6 which is rigidly fixed to the shaft 4 and a reversible electric motor 9 which is mounted in the frame F beneath the base 1 and whose output shaft carries a pinion 10 mating with the gear 6. The motor 9 may be started by a manually operable switch 9a shown in FIG. 1.

Adjacent to its forward edge, the base 1 is provided with an upwardly extending arresting element 8 (omitted in FIG. 1) which stops each inverted mat in such position on the base that the mats are ready for automatic or manual transfer to the stacking station C. The arresting element should not be too high because it could hinder the workman or workmen in charge of transferring alternating inverted and non-inverted mats to the stacking station C. In addition to or as a substitute for the switch 9a, the means for controlling the motor 9 preferably comprises an electric, hydraulic, pneumatic, electromagnetic or purely mechanical operative connection 12 (shown in phantom lines in FIG. 1) which receives impulses at the welding station, e.g., by a trip located in the path of mats and arranged in such a way as to start the motor 9 in response to advance of each second mat toward the inverting station A. Of course, it is equally possible to manually start the motor 9 by the switch 9a at such intervals that a first mat slides transversely across the base 1 without being engaged by the turning member 3, that the next mat is inverted as soon as it moves onto the supporting surface 1a, that the third mat is again free to pass uninverted across the surface 1a, and so on.

The operation of the inverting apparatus at the station A is as follows:

When the mat M comes to rest on the surface 1a, the motor 9 is started by the switch 9a or by the connection 12 in a sense to turn the segmental gear 6 and to thereby turn the shaft 4 with the arms 3a–3c in clockwise direction, as viewed in the direction of the arrow 13 shown in FIG. 2, so that the number 3 moves through the phantom-line position 3' of FIG. 2 and to the inverting position 3" of FIG. 3. When the turning member reaches or is close to the position 3', the mat M begins to slide downwardly toward and comes into abutment with the trough 7 while at the same time advancing toward and into abutment with the chute 5. The angle covered by the arms 3a–3c during movement of the turning member between the full-line position 3 of FIG. 2 and the inverting position 3" of FIG. 3 preferably exceeds only slightly 90 degrees, e.g. this angle may be about 100 degrees. Such angular movement of the member 3 is sufficient to deposit the mat M against the inclined chute 5 in partly inverted position and, as soon as the member 3 returns from the position of FIG. 3 through the position of FIG. 4 (arrow 14) and back to the idle position of FIG. 5, the mat begins to slide along the chute 5 and along the latter's trough 7 back onto the supporting surface 1a to assume a fully inverted position as shown in FIG. 5, i.e. the longitudinal rods 21 which were originally supported by the surface 1a (FIG. 2) are now separated from this surface by the transverse rods 22. If its momentum should carry the inverted mat M beyond the requisite position on the surface 1b, the front ends of the transverse rods 22 or the foremost longitudinal rod 21 will come into abutment with the arresting element 8 so that the inverted mat is in optimum position for transfer to the stacking station C, i.e. the inverted mat is located on that same portion of the supporting surface 1a from which it was lifted by the arms 3a–3c.

The motor 9 may be reversed in a fully automatic way, for example, by a limit switch 15 which is actuated by one of the arms 3a–3c in the position of FIG. 3, by the segmental gear 6 or by a suitable stud 16 provided on the shaft 4.

Figure 4:
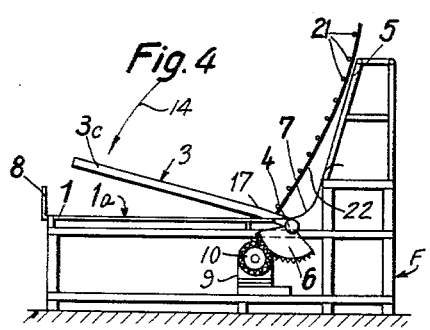
FIG. 4 shows the structure of FIGS. 2 and 3 with the turning member in an intermediate position.

It will be noted that each of the arms 3a–3c is provided with a hump consisting of a comparatively short rearwardly and downwardly inclined portion 17 which is adjacent to the shaft 4. The purpose of these inclined portions is to perform a braking action and to prevent the partly inverted mat M (FIG. 4) from immediately following the turning member 3 when the latter begins to return from the position 3" to the position of FIG. 5. As shown in FIG. 4, the lower ends of the transverse rods 22 move upwardly along the inclined portions 17 when the member 3 begins to descend, and the inverted mat will begin to slide onto the surface 1a only at the time or shortly before the arms 3a–3c reach the position of FIG. 5. FIG 3 shows that the arms 3a–3c need not move all the way to the chute 5 whose inclination exceeds the inclination of these arms in inverting position 3" of the turning member 3. For example, the inclination of the chute 5 may be about 120 degrees. It will be noted in FIG. 3, that the inclination of the end portions 17 approaches or equals the inclination of the chute 5 in inverting position of the member 3. The entire inverting operation may be completed within exceptionally short periods of time, e.g. four seconds.

It will be readily understood that the means 6, 10 for rocking the shaft 4 between the positions of FIGS. 2 and 3 may assume the form of a chain-and-sprocket drive, of a suitable cam-and-follower arrangement, or the like. Also, the number of arms forming part of the turning member 3 may be reduced to two or it may be increased to four or more, depending on the dimensions of the mats, on their weight, and on the profile of the arms. In the illustrated embodiment, the arms 3a–3c assume the form of T-bars. Furthermore, the upper edge portion of the chute 5 may be secured to the frame F by means of horizontal hinges 18 so as to permit angular adjustments of the chute if changes in inclination of the chute are necessary when the inverting apparatus is utilized in connection with different types of mats.

A very important advantage of the invention apparatus is that personnel heretofore employed for the purpose of inverting each second mat may be put to work at the welding station B, and that a single workman can readily move an inverted mat from the station A to the stacking station C. Heretofore, welded iron or steel mats utilized as concrete reinforcing structures were inverted by hand and, since the weight of such mats often exceeds 100 lbs., two workmen had to reverse each second mat before placing it onto the pile of mats at the stacking station. In the long run, such work is extremely tiring, especially since the inverting operation must be carried out very rapidly in order to make sure that the cross-wire welding apparatus at the station B may operate at full capacity. If the workmen employed to invert each second mat belong to the crew which feeds longitudinal and transverse rods to the welding apparatus, they must interrupt their work at the welding station whenever a newly formed mat must be inverted prior to its deposition on the pile of previously completed mats. This means that the welding station is undermanned which can result in lower output of the welding apparatus or may even lead to serious accidents.

On the other hand, if the crew at the welding station remains at full strength, two additional laborers must be employed at the inverting station if the mats are turned by hand.

The advantage of stacking each second mat in inverted position is that the mats occupy less space and that the height of the pile is reduced by up to 45 percent which is of considerable importance since the volume of the storage space is nearly halved and since the costs for transportation are reduced to a very large extent. In addition, a shifting of stacked mats and eventual collapsing of a pile is much less likely if the mats are staggered in a manner as shown in FIG. 6, i.e. with the longitudinal or transverse rods of an inverted mat extending into the spaces between the longitudinal or transverse rods of a non-inverted mat.

By utilizing an inverting apparatus of the type shown in FIGS. 1 to 5, the crew which operates the welding machine need not take care of inverting each second mat, and a single workman can advance the non-inverted and the mechanically inverted mats from the base 1 to the stacking station C. In other words, the crew at the welding station remains at full strength so that the welding machine may operate at full capacity. It has been found that the output of the welding machine at the station B may be increased by about 25 percent if its crew need not take care of inverting each second mat. In addition, the inverting apparatus eliminates extremely tiresome manual work necessary for turning each second mat through 180 degrees. Since the inverting apparatus of my invention may be placed immediately adjacent to the welding machine, the system of FIG. 6 may operate without expensive conveyors or like advancing means between the welding and stacking stations. It is preferred to arrange the welding station in such a way that consecutively formed mats will slide automatically onto the supporting surface 1a of the inverting apparatus at the station A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for inverting concrete reinforcing mats and like flat objects, comprising a base having a substantially horizontal object supporting surface and including a front edge portion and a spaced rear edge portion; a chute extending upwardly from said rear edge portion and enclosing an obtuse angle with said supporting surface; a horizontal shaft substantially parallel with and adjacent to said rear edge portion; a single object-engaging turning unit comprising a plurality of spaced arms turnable in unison about the axis of said shaft between a substantially horizontal idle position beneath the object supported by said surface and an inverting position adjacent to said chute so that the object lifted by said arms is deposited on and slides in inverted position along said chute and back onto said supporting surface; abutment means extending upwardly from said supporting surface and actuating adjacent to the front edge portion of said base for arresting the inverted object on said surface; and means operatively connected with said shaft for turning the arms between said idle and inverting positions, each of said arms having a substantially straight rearwardly and downwardly inclined portion adjacent said shaft for retarding the sliding movement of the inverted object back onto said supporting surface until said arms approach said substantially horizontal idle position again, the sliding movement of said object being retarded by said inclined portions in proportion to the angular position of said arms while moving between said idle and inverting positions.

2. Apparatus for inverting concrete reinforcing mats and like flat objects, comprising a base having a substantially horizontal object supporting surface and including a rear edge portion; a chute extending upwardly from said rear edge portion and enclosing an obtuse angle with said supporting surface; a concave trough extending from said chute to said supporting surface to form a smooth transition therebetween; a generally horizontal shaft substantially parallel with and adjacent to said rear edge portion; a single object-engaging turning unit comprising at least two spaced arms turnable in unison about the axis of said shaft; and actuating means operatively connected with said arms for turning said arms between a substantially horizontal idle position beneath an object supported by said surface and an inverting position adjacent to said chute so that the object when lifted by said arms abuts said chut and tends to slide in inverted position along said chute and back onto said supporting surface, each arm having a substantially straight rearwardly and downwardly inclined portion adjacent said shaft for retarding the sliding movement of the inverted object back onto said supporting surface and for thereby maintaining said object substantially at said obtuse angle until said arms approach said substantially horizontal idle position again, the sliding movement of said object being retarded by said inclined portions in proportion to the angular position of said arms while moving between said idle and inverting positions.

3. Apparatus as set forth in claim 2, wherein said base has a front edge portion opposite said rear edge portion and has abutment means thereon adjacent said front edge portion, said abutment means extending upwardly from said supporting surface of said base for arresting the inverted object on said surface when said object slides off said chute due to its own weight in response to said arms closely approaching said idle position.

4. Apparatus as set forth in claim 2, including at least one toothed segment for turning said arms.

5. Apparatus as set forth in claim 4, wherein said toothed segment is connected to said shaft, said arms being secured to said shaft for movement therewith.

6. In an apparatus for inverting concrete reinforcing mats and like substantially flat objects, in combination, an inclined chute having a lower portion; an object-supporting turning member having a pivot axis adjacent to the lower portion of said chute; actuating means for turning said member about said pivot axis between a substantially horizontal idle position in which an object may be supported thereon and an inverting position in which said turning member is adjacent said chute and places the object against said chute so that said object is partially inverted and tends to slide in inverted position back onto said turning member while the latter returns to said idle position; and retarding means on said turning member for temporarily retarding the sliding movement of the partially inverted object until said turning member again approaches its substantially horizontal idle position, said retarding means including substantially straight rearwardly and downwardly inclined surface portions adjacent said pivot axis.

7. A system of the character described comprising, in combination, a welding machine for producing concrete reinforcing mats and like flat objects; a tacking station at which the consecutively produced mats are stacked one atop the other; and an inverting apparatus disposed intermediate said welding machine and said station for inverting each second mat advanced from said machine to said station so that consecutively produced mats are stacked at said station in such a way that inverted mats alternate with non-inverted mats, said apparatus comprising a base having a substantially horizontal mat supporting surface, a chute adjacent to and extending above said base and enclosing an angle of at least 90 degrees with said supporting surface, a single mat-engaging turning unit having a pivot axis substantially parallel with said surface and adjacent to the lower portion of said chute, means for turning said single unit between an idle position in which said single turning unit is located below a mat supported on said surface and an inverting position in which said single turning unit is adjacent to said chute so that the object is transferred onto the chute in inverted position and slides back onto said supporting surface when said single turning unit returns to said idle position, and an operative connection between said turning means and said welding machine for moving said single turning unit to said inverting position in response to advance of each second mat onto said supporting surface.

References Cited by the Examiner
UNITED STATES PATENTS

| | | |
|---|---|---|
| 2,271,213 | 1/42 | Weidner et al. |
| 2,915,199 | 12/59 | Evans. |
| 2,964,203 | 12/60 | Ray |
| 2,981,420 | 4/61 | Johanson. |

FOREIGN PATENTS

| | | |
|---|---|---|
| 825,874 | 12/59 | Great Britain. |

HUGO O. SCHULZ, *Primary Examiner.*
WHITMORE A. WILTZ, *Examiner.*